United States Patent Office 3,657,304
Patented Apr. 18, 1972

3,657,304
BIS(CYANOORGANOSILYL)HYDROCARBONS, BIS (AMINOORGANOSILYL)HYDROCARBONS AND METHODS FOR MAKING THEM
Fred F. Holub, Abe Berger, and Terry G. Selin, Schenectady, N.Y., assignors to General Electric Company
No Drawing. Filed Nov. 28, 1969, Ser. No. 880,922
Int. Cl. C07f 7/02
U.S. Cl. 260—448.2 N      8 Claims

ABSTRACT OF THE DISCLOSURE

Bis(aminoorganosilyl)hydrocarbons, such as 1,4 - bis-(aminobutyldimethylsilyl)benzene are made by hydrogenating the corresponding bis(cyanoorganosilyl)hydrocarbons. The bis(cyanoorganosilyl)hydrocarbons can be made by the platinum catalyzed addition of an aliphatically unsaturated nitrile such as allyl cyanide to a bis (organosilyl)hydrocarbon such as bis(dimethylsilyl)benzene. The bis(aminoorganosilyl)hydrocarbons are useful as silanol curing agents, and as intermediates for making polyimides; the bis(cyanoorganosilyl)hydrocarbons can be employed as antistats for synthetic fibers, additives for channel sealant greases to impart improved solvent characteristics thereto, etc.

---

The present invention relates to certain bis(organofunctionalsilyl)hydrocarbons, such as bis(aminoorganosilyl) hydrocarbons, and methods for making these materials.

Among the bis(organofunctionalsilyl)hydrocarbons of the present invention, there are included compounds of the formula, (1) 

where Y is selected from nitrile and amino, R is selected from monovalent hydrocarbon radicals and halogenated monovalent hydrocarbons and R' and R'' are selected from divalent hydrocarbon radicals and halogenated divalent hydrocarbon radicals. Included by the compounds of Formula 1, are bis(aminoorganosilyl)hydrocarbons, or diamines of the formula, (2) 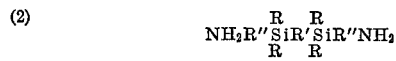

where R, R' and R'' are as previously defined.

Radicals included by R of Formulas 1 and 2 are for example, aryl radicals and halogenated aryl radicals, such as phenyl, chlorophenyl, tolyl, naphthyl, etc.; alkyl radicals and halogenated alkyl radicals such as methyl, ethyl, propyl, butyl, pentyl, trifluoropropyl, etc. Radicals included by R' and R'' are, for example, arylene radicals and halogenated aryleen radicals, such as phenylene, tolylene, chlorophenylene, xylylene, etc., alkylene radicals such as methylene, ethylene, propylene, butylene, pentylene, etc. In Formulas 1 and 2 where R and R'' can represent more than one radical, these radicals can be the same or a mixture of two or more of the above radicals.

In accordance with the practice of the invention, the bis(aminoorganosilyl)hydrocarbons of Formula 2 can be made by (A) effecting addition between a bis(organosilyl)hydrocarbon or "dihydride" of the formula, (3) 

and an aliphatically unsaturated nitrile defined below, in the presence of an effective amount of a platinum catalyst, (B) hydrogenating the resulting bis(cyanoorganosilyl)hydrocarbon of (A), and (C) recovering the bis(aminoorganosilyl)hydrocarbon from (B), where R and R' are as previously defined.

There are included by the dihydrides of Formula 3, tetramethyldisilethane, tetramethyldisilpropane, tetraethyldisilbutane, 1,4 - bis(dimethylsilyl)benzene, 1,3-bis(diphenylsilyl)benzene, ethyltrimethyldisilmethane, chloromethyltrimethyldisilpropane, etc.

The dihydrides of Formula 3 can be made by coupling phenylene Grignard reagents, such as phenylene 1,4-bis magnesium bromide with dimethylchlorosilane or dimethyldichlorosilane, followed by reducing the resulting bis (dimethylchlorosilyl)benzene with lithium aluminum hydride, hydrosilation of dimethylvinylchlorosilane with dimethylchlorosilane followed by the reduction of the resulting bis(dimethylchloro)ethane with lithium aluminum hydride, etc.

There are included by the aliphatically unsaturated nitriles utilized in combination with the dihydrides of Formula 3 above, compounds of the formula,

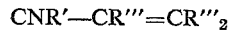

where R' is as previously defined and R''' is selected from hydrogen and R radicals. For example, there are aliphatically unsaturated nitriles such as allyl cyanide, 3-methylallyl cyanide, crotononitrile, acrylonitrile, methacrylonitrile, 4-butenenitrile, 5-pentenonitrile, etc.

The bis(cyanoorganosilyl)hydrocarbons or "dinitriles" provided by the practice of the inventions having the formula, (4) 

where R, R', and R'' are as previously defined. Some of the bis(cyanosilyl)hydrocarbons are, for example, 1,4-bis (cyanopropyldimethylsilyl)benzene, 1,2-bis(cyanoethyldimethylsilyl)ethane, 1,3 - bis(cyanopropyldiethylsilyl)propane, 1,2 - bis(cyanopropyldimethylsilyl)ethane, 1,3 - bis (cyanobutyldiethylsilyl)benzene, 1,2 - bis(cyanopropyldimethylsilyl)hexane, etc.

The diamines of Formula 2 are useful as intermediates for preparing modified polyamides and polyamide acids when combined with organic diacidchloride, chloroformylanhydrides, or organic dianhydrides as described in our copending application (RD–2771) filed concurrently herewith and assigned to the same assignee as the present invention. These materials can be converted by heat to molding compounds and polyamide and polyimide insulating films having improved corona resistance. The diamines also are useful as curing catalysts for organopolysiloxane resin compositions, antioxidants, neutralizing compounds, etc.

The dinitriles are useful for treating synthetic fibers, such as polyamides, etc., which, when cured on these fibers with an organic peroxide, render the fibers resistant to static charges; as chemically combined additives for organic rubbers to make them swell resistant to hydrocarbon fuels, etc.

In the practice of the invention, reaction is effected between the dihydride of Formula 2, and an aliphatically unsaturated nitrile in the presence of a platinum catalyst to produce a dinitrile. The dinitrile is then reduced with hydrogen under pressure in the presence of a metal catalys to convert it to the corresponding diamine.

In making the dinitrile, contact is effected between the aliphatically unsaturated nitrile and the dihydride in the presence of an effective amount of a platinum catalyst, such as from 10 to 500 parts of platinum, per million parts of reaction mixture. During the addition, temperatures in the range of from 25° C. to 195° C. can be employed. Suitable platinum catalysts which can be utilized are, for example, shown by Lamoreaux Pat. 3,220,972, Ashby Pat. 3,159,601, etc., assigned to the same assignee as the present invention. The addition also can be effected in the presence of a suitable organic solvent such as toluene, diglyme, etc. At the termination of the addition reaction, the dinitrile can be recovered by standard filtration and distillation techniques. In instances where the mixture is free of dihydride, the dinitrile reaction mixture can be used directly to prepare the diamine.

The dinitriles can be converted to the diamines by effecting the reduction of the dinitrile with hydrogen. A preferred method utilizes Raney nickel as a catalyst at temperatures in the range of between 25° C. to 150° C., in the presence of hydrogen at pressures up from 15 p.s.i. to 3,000 p.s.i. while the reaction mixture is agitated. Reduction of the dinitrile can be effected in as little as 60 minutes or less to 72 hours or more, depending upon the conditions such as temperature, activity of catalyst, degree of agitation, etc., and reactants employed. Recovery of the diamine can be achieved by filtering the reaction mixture of Raney nickel, and recovering the diamine by distilling it from the mixture. Suitable solvents which can be utilized, for example, are ethanol, toluene, etc.

In order that those skilled in the art will be better able to practice the invention, the following examples are given by way of illustration and not by way of limitation. All parts are by weight.

EXAMPLE 1

There were added dropwise 30 parts of allyl cyanide to 58 parts of a stirred mixture at 110° C.–20° C. of p-bis(dimethylsilyl)benzene containing about 100 parts of platinum in the form of chloroplatinic acid, per million parts of mixture. During the addition, an exothermic reaction occurred resulting in a spontaneous temperature rise to 135° C. The temperature of the mixture was thereafter maintained between 120°–140° C. by controlling the rate of addition of the allyl cyanide. After the addition, the mixture was stirred continuously for two hours while being maintained at a temperature of about 130° C. The mixture was then fractionated. There was obtained 73.6 parts of product boiling at 240° C. at 0.5 mm. This represented about an 80 percent yield of product. Based on its method of preparation and its infrared spectrum showing nitrile absorption at 4.45$\mu$, phenylene absorption at 8.9$\mu$ and total absence of silicon hydride, the product was p-bis(cyanopropyldimethylsilyl)benzene.

A piece of polyethyleneterephthalate cloth is impregnated with a 10 percent toluene solution of the above dinitrile containing an effective amount of benzoyl peroxide. The treated cloth is then cured at 150° C. for three hours. When compared to similar polyethyleneterephthalate cloth which is not treated in the aforedescribed manner, the treated cloth exhibits valuable antistat properties as shown by its inability to pick up small pieces of paper after it is rubbed with a woolen cloth.

EXAMPLE 2

A mixture of 62 parts of 1,4-bis(cyanopropyldimethylsiliyl)benzene of Example 1, and 22 parts of Raney nickel was pressurized to 55 p.s.i. with hydrogen gas. The mixture was agitated over a period of 7 hours while maintaining the temperature between 70° to 80° C. During the reduction, additional hydrogen was employed to maintain the pressure at 55 p.s.i. When hydrogen absorption ceased, the mixture was cooled and depressurized. The reaction product was then decanted from the mixture. The mixture was distilled and 35 parts of product boiling at 184° C./1 mm. Based on method of preparation and its infrared spectrum, the product was 1,4-bis(aminobutyldimethylsilyl)benzene.

An organopolysiloxane resin is prepared consisting of 50 parts of the product obtained by hydrolyzing 4 moles of trimethylchlorosilane, per mole of sodium ethyl silicate, and 50 parts of a silanol terminated polydimethylsiloxane fluid having an average of about 25 chemically combined dimethylsiloxy units. There is added to the mixture, one percent by weight 1,4-bis(aminobutyldimethylsilyl)benzene. Toluene is added to the mixture to produce a solution having 70 percent by weight solids.

A glass tape is dipped into the solution and then allowed to dry. The tape is found to be adhesive to the touch even though it is free of solvent. The treated tape is then heated at 150° C. for about 10 minutes. The tape is then found to be adhesive to the touch and is a valuable insulating material.

EXAMPLE 3

There was added dropwise 146 parts of tetramethyldisilethane to 135 parts of a stirred mixture of allyl cyanide and chloroplatinic acid which was present in the mixture at a concentration sufficient to provide for about 100 parts of platinum, per million parts of mixture. During the addition, the temperature of the mixture rose from an initial 95° C. to a temperature of 123° C. After the addition which lasted about two hours, the mixture was heated to a temperature of between 130°–140° C. for two additional hours. Based on a vapor phase chromatograph of a sample of the mixture, it appeared that the addition was completed. The mixture was then fractionated. There was obtained 204 parts of product having a boiling point of 168° C. at 0.6 mm. Based on its infrared spectrum and its method of preparation, the product was 1,2-bis(cyanopropylidimethylsilyl)ethane.

EXAMPLE 4

A mixture of 50 parts of the 1,2-bis(cyanopropyldimethylsilyl)ethane of Example 3, and 20 parts of Raney nickel was agitated over a period of 7 hours at a temperature of 80° to 90° C. while maintaining the pressure at about 55 p.s.i. The mixture was then depressurized and a product was recovered having a boiling point of 136–138° C./1 mm. Based on method of preparation and its infrared spectrum, the product was sym-bis(aminobutyldimethylsilyl)ethane.

Although the above examples illustrate only a few of the very many bis(organofunctionalsilyl)hydrocarbons of Formula 1, or methods for making these materials, it should be understood that the present invention is directed to a much broader class of such diamines and dinitriles which can be made by effecting reaction between aliphatically unsaturated nitriles and the bis(organosilyl)hydrocarbons of Formula 3, in accordance with the practice of the invention, followed by the reduction of the resulting dinitrile to the diamine.

We claim::

1. Bis(organofunctionalsilyl)hydrocarbons of the formula,

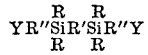

where Y is selected from nitrile and amino, R is a monovalent radical, selected from the class consisting of aryl hydrocarbon radicals having up to 10 carbon atoms, monochlorinated aryl hydrocarbon radicals having up to 10 carbon atoms, and lower alkyl radicals, R' is a hydrocarbon radical selected from the class consisting of alkylene radicals and arylene radicals and R" is selected from alkylene radicals.

2. A dinitrile in accordance with claim 1, where R is methyl, R' is phenylene, and R" is propylene.

3. A dinitrile in accordance with claim 1, where R is methyl, R' is ethylene, and R" is propylene.

4. Bis(aminoorganosilyl)hydrocarbons of the formula,

where R, R' and R" are as defined in claim 1.

5. A diamine in accordance with claim 4, where R is methyl, R' is phenylene, and R" is butylene.

6. A diamine in accordance with claim 4 where R is methyl, R' is ethylene, and R" is butylene.

7. A method for making bis(cyanoorganosilyl)hydrocarbons comprising (1) effecting addition between a bis(organosilyl)hydrocarbon of the formula,

and an aliphatically unsaturated nitrile in the presence of an effective amount of a platinum catalyst, and (2) recovering the bis(organosilyl)hydrocarbon from the mixture of (1) where R is a monovalent radical selected from the class consisting of aryl radicals having up to 10 carbon atoms, monochlorinated aryl radicals having up to 10 carbon atoms, and lower alkyl radicals, and R' is selected from the class consisting of alkylene radicals and arylene radicals.

8. A method for making bis(aminoorganosilyl)hydrocarbons of the formula,

which comprises (1) effecting addition between the bis(organosilyl)hydrocarbons of the formula,

and an aliphatically unsaturated nitrile in the presence of an effective amount of platinum catalyst, (2) hydrogenating the resulting bis(cyanoorganosilyl)hydrocarbon of (1), and (3) recovering the bis(aminoorganosilyl)hydrocarbon from (2), where R is a monovalent hydrocarbon radical selected from the class consisting of aryl radicals having up to 10 carbon atoms, monochlorinated aryl radicals having up to 10 carbon atoms, and lower alkyl radicals and R' is selected from the class consisting of alkylene radicals and arylene radicals.

References Cited
UNITED STATES PATENTS 3,257,440  6/1966  Jex _____ 260—448.2 N
2,754,311  7/1956  Elliott _____ 260—448.2 N TOBIAS E. LEVOW, Primary Examiner
W. F. W. BELLAMY, Assistant Examiner